United States Patent
Lee et al.

(10) Patent No.: US 9,426,743 B2
(45) Date of Patent: Aug. 23, 2016

(54) SYSTEMS AND METHODS TO OPTIMIZE POWER CONSUMPTION FOR LTE EMBMS

(71) Applicant: QUALCOMM Incorporated, San Diego, CA (US)

(72) Inventors: Kuo-Chun Lee, San Diego, CA (US); Praveen Appu, San Diego, CA (US); Shailesh Maheshwari, San Diego, CA (US); Anil Satyanarayana Rao, San Diego, CA (US); Muhammad Arif Munif, San Diego, CA (US); Sandeep Singhai, San Diego, CA (US); Sanket Shah, San Diego, CA (US); Hashim Shaik, San Diego, CA (US); Jack Shyh-Hurng Shauh, San Diego, CA (US); Randy Vinh Tran, San Diego, CA (US); Sivaramakrishna Veerepalli, San Diego, CA (US); Ying Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 58 days.

(21) Appl. No.: 14/100,974

(22) Filed: Dec. 9, 2013

(65) Prior Publication Data
US 2014/0192693 A1    Jul. 10, 2014

Related U.S. Application Data

(60) Provisional application No. 61/750,143, filed on Jan. 8, 2013.

(51) Int. Cl.
*G08C 17/00*    (2006.01)
*H04W 52/02*    (2009.01)

(52) U.S. Cl.
CPC ............ *H04W 52/0229* (2013.01); *Y02B 60/50* (2013.01)

(58) Field of Classification Search
CPC . H04W 52/02; H04W 52/0216; H04W 84/12; H04W 52/0229; H04W 84/18
USPC ........................................................ 370/311
See application file for complete search history.

(56) References Cited

U.S. PATENT DOCUMENTS 7,965,651 B2 *  6/2011  Du ...................... H04W 76/048
                                                370/252
8,331,256 B2 * 12/2012  Lee ................... H04W 36/0088
                                                370/252

(Continued)

OTHER PUBLICATIONS

Bontu C., et al., "DRX mechanism for power saving in LTE," IEEE Communications Magazine, IEEE Service Center, Piscataway, US, vol. 47 (6), Jun. 1, 2009, pp. 48-55, XP011281824, ISSN: 0163-6804, DOI: DOI:10.1109/MCOM.2009.5116800.

(Continued)

*Primary Examiner* — Mark Rinehart
*Assistant Examiner* — Sanjay K Dewan
(74) *Attorney, Agent, or Firm* — Norton Rose Fulbright US LLP

(57) ABSTRACT

Aspects of the present disclosure are directed to a methods and systems operable by a network entity for wireless communication, that includes determining that User Equipment (UE) is in idle mode and receiving eMBMS (evolved Multimedia Broadcast and Multicast Service); and based on the determining, activating a power optimization procedure in order to reduce power consumption of the UE. Examples of a power optimization procedures include a single or multi-level hardware shut down procedure, lowering the clock rate of hardware, and shutting down a communication bus during periods of non-use.

17 Claims, 9 Drawing Sheets

(56) References Cited

U.S. PATENT DOCUMENTS

| | | | |
|---|---|---|---|
| 8,369,883 B2* | 2/2013 | Kuroda et al. | 455/522 |
| 8,494,594 B2* | 7/2013 | Ryu | H04W 52/0251 370/311 |
| 8,755,314 B2* | 6/2014 | Park et al. | 370/311 |
| 2005/0190709 A1* | 9/2005 | Ferchland | H04W 52/0287 370/311 |
| 2009/0122736 A1 | 5/2009 | Damnjanovic et al. | |
| 2009/0147717 A1 | 6/2009 | Cai | |
| 2009/0149164 A1 | 6/2009 | Cai | |
| 2009/0180414 A1* | 7/2009 | Maeda | H04W 52/028 370/311 |
| 2010/0128646 A1 | 5/2010 | Gao | |
| 2011/0194428 A1 | 8/2011 | Wang et al. | |
| 2012/0120860 A1* | 5/2012 | Chui | H04B 1/711 370/311 |
| 2012/0122495 A1* | 5/2012 | Weng et al. | 455/458 |
| 2012/0148246 A1* | 6/2012 | Mukai et al. | 398/58 |
| 2012/0177361 A1* | 7/2012 | Hirano et al. | 398/1 |
| 2013/0107784 A1* | 5/2013 | Chang | H04W 72/005 370/312 |
| 2013/0121226 A1 | 5/2013 | Anchan et al. | |
| 2014/0064165 A1* | 3/2014 | Chung et al. | 370/311 |
| 2014/0086128 A1* | 3/2014 | Gomez | H04B 1/401 370/311 |
| 2014/0092799 A1* | 4/2014 | Jain et al. | 370/311 |
| 2014/0274223 A1* | 9/2014 | Kleve | H04W 52/0209 455/574 |
| 2015/0071139 A1* | 3/2015 | Nix | 370/311 |

OTHER PUBLICATIONS

International Search Report and Written Opinion—PCT/US2013/074338—ISA/EPO—Apr. 4, 2014.

* cited by examiner

SYSTEMS AND METHODS TO OPTIMIZE POWER CONSUMPTION FOR LTE EMBMS

CROSS-REFERENCE TO RELATED APPLICATIONS

The present application claims priority to co-pending U.S. Provisional Patent Application Ser. No. 61/750,143, entitled SYSTEMS AND METHODS TO OPTIMIZE POWER CONSUMPTION FOR LTE eMBMS, filed Jan. 8, 2013, the disclosure of which is incorporated herein by reference in its entirety.

BACKGROUND

1. Field

Aspects of the present disclosure relate generally to wireless communication systems, and more particularly, to optimization of wireless communication systems using evolved Multimedia Broadcast-Multicast Service (eMBMS).

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

Recent LTE versions support eMBMS in the LTE air interface to provide the video streaming and file download broadcast delivery. For example, video streaming service is expected to be transported by the DASH (Dynamic Adaptive Streaming using HTTP) protocol over FLUTE (File Delivery over Unidirectional Transport) as defined in IETF RFC 3926 over UDP/IP packets. File download service is transported by FLUTE over UDP/IP protocols. Both higher layers over IP are processed by the LTE broadcast channels in PHY and L2 (including MAC and RLC layers). However, such transport includes multiple inefficiencies which are not currently addressed in the communications industry.

One such inefficiency is found in power management. UEs may from time to time be powered by a power supply of limited capacity, such as a battery. When hardware within a device is powered on, the device consumes power. As long as a hardware component is active, power consumption occurs whether or not the device is in active communication. Because a UE may be relying on a limited power supply, such as a battery, reducing power consumption optimizes the use of a limited power supply and is desirable.

SUMMARY

Various representative aspects of the present disclosure are directed to a method operable by a network entity for wireless communication, that includes determining, by a processor device, that User Equipment (UE) is in idle mode and receiving eMBMS (evolved Multimedia Broadcast and Multicast Service); and based on said determining, activating a power optimization procedure in order to reduce power consumption of the UE.

In some embodiments the power optimization procedure can be a single level or multiple level hardware shut down including one or more of: a deep sleep, a light sleep, and a micro sleep (alternatively called a verylight sleep). Further, some exemplary methods include identifying that the UE does not have unicast high speed data transmission and reception; and based on the identifying and the determining, activating a power optimization procedure in order to reduce power consumption of the UE.

Additionally (or alternatively), in embodiments, the power optimization procedure lowers a clock rate of at least some hardware of the UE. In further embodiments, the power optimization procedure may additionally or alternatively lower power consumption the UE by temporarily shutting down a communication bus between hardware of the UE, for example, a communication bus between a Modem chip set and an Application chip set.

Additional representative aspects of the present disclosure are directed to a communication apparatus that includes means for determining that User Equipment (UE) is in idle mode and receiving eMBMS (evolved Multimedia Broadcast and Multicast Service); and based on said determining, means for activating an optimization procedure in order to reduce power consumption of the UE.

Further representative aspects of the present disclosure are directed to a non-transitory computer-readable medium having program code stored thereon. The program code, when executed by a computer, causes the computer to determine that User Equipment (UE) is in idle mode and receiving eMBMS (evolved Multimedia Broadcast and Multicast Service); and based on said determination, activate a power optimization procedure in order to reduce power consumption of the UE.

Additional representative aspects of the present disclosure are directed to an apparatus configured for wireless communication that includes at least one processing device operable to determine that User Equipment (UE) is in idle mode and receiving eMBMS (evolved Multimedia Broadcast and Multicast Service), wherein based on said determination the processing device is further operable to activate a power optimization procedure in order to reduce power consumption of the UE.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
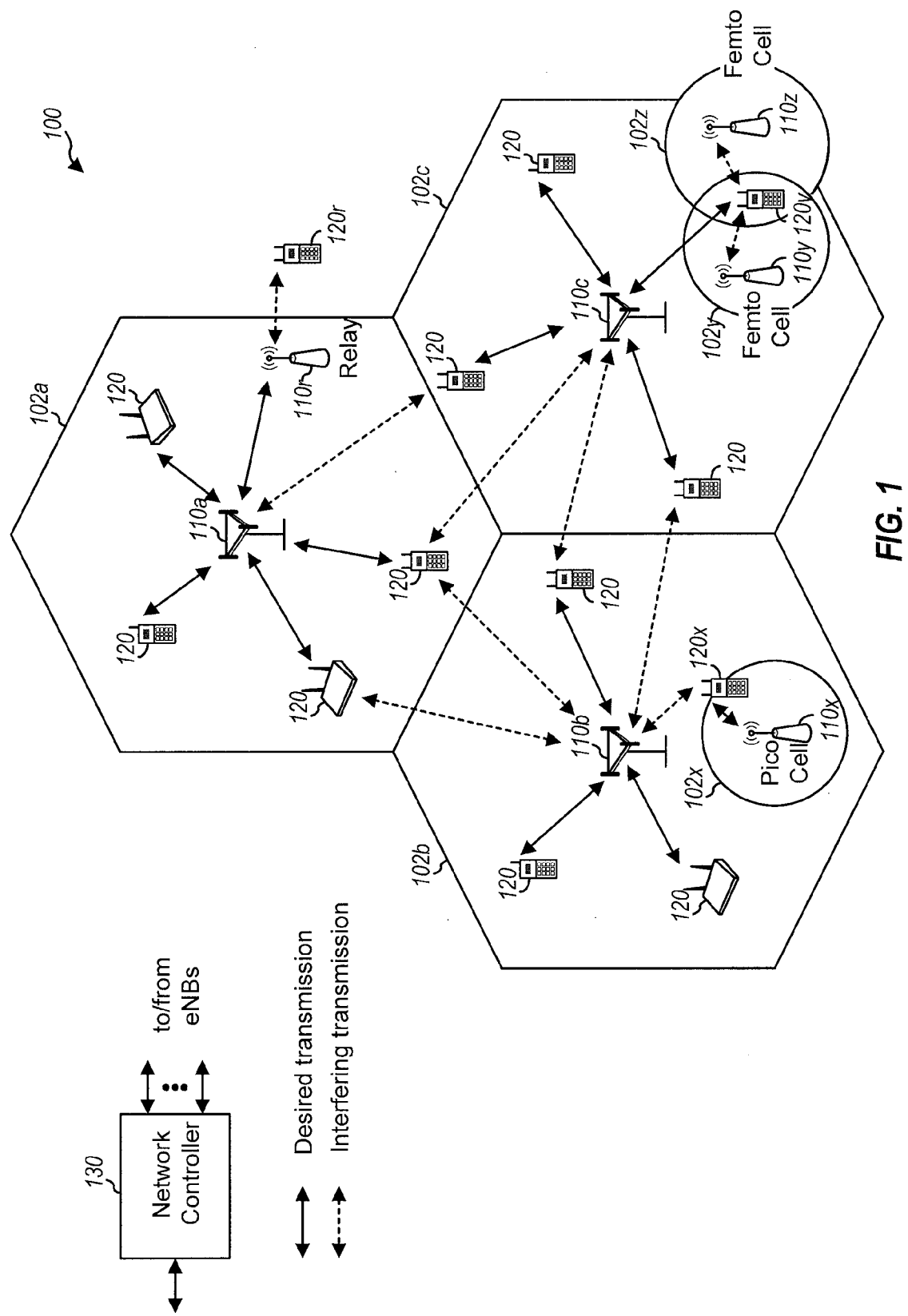
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8, 12, or 16 subbands for system bandwidth of 1.25, 2.5, 5, 10 or 20 MHz, respectively.

Figure 2:
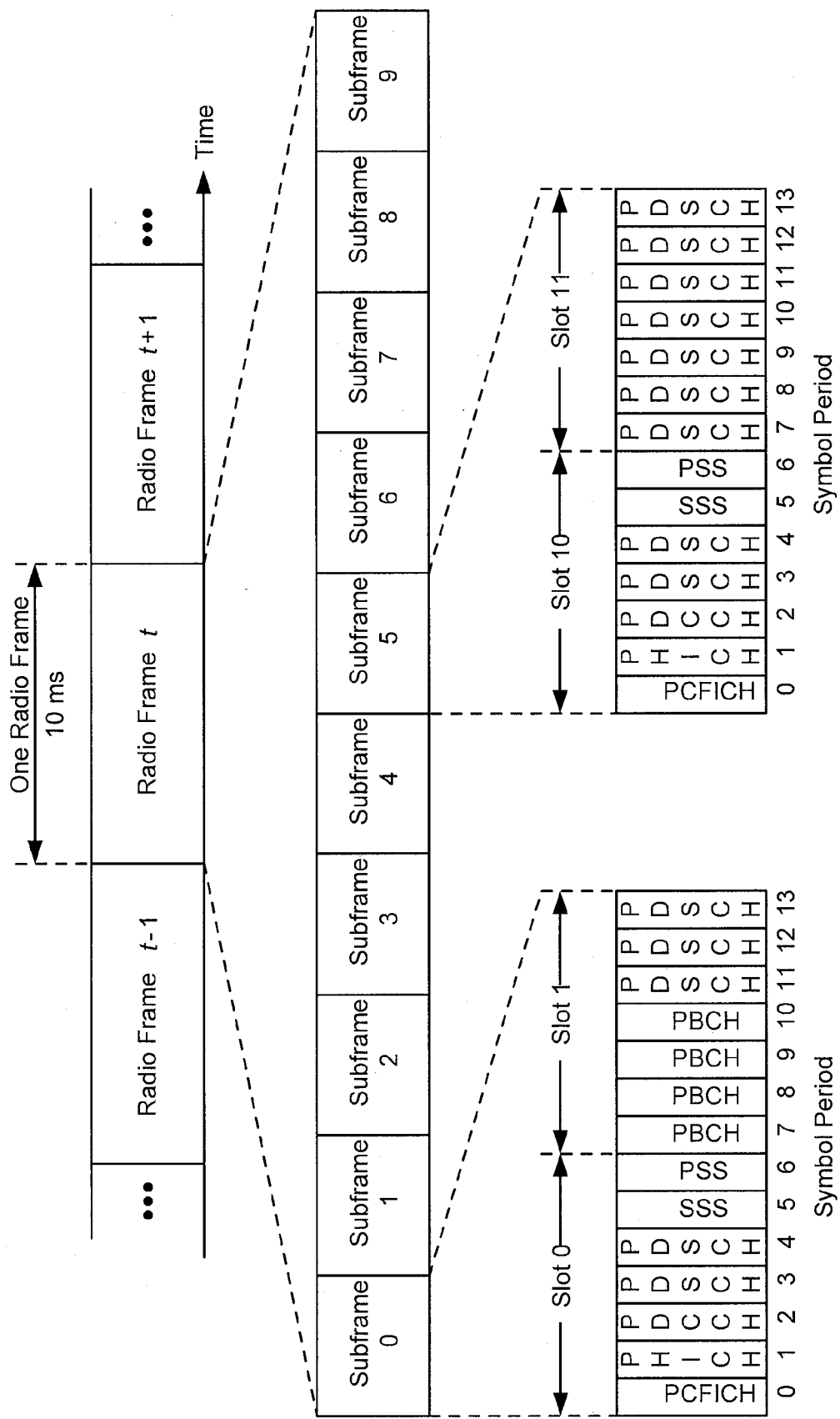
FIG. 2 is a block diagram conceptually illustrating an example of a down link frame structure in a telecommunications system.
Figure 6:
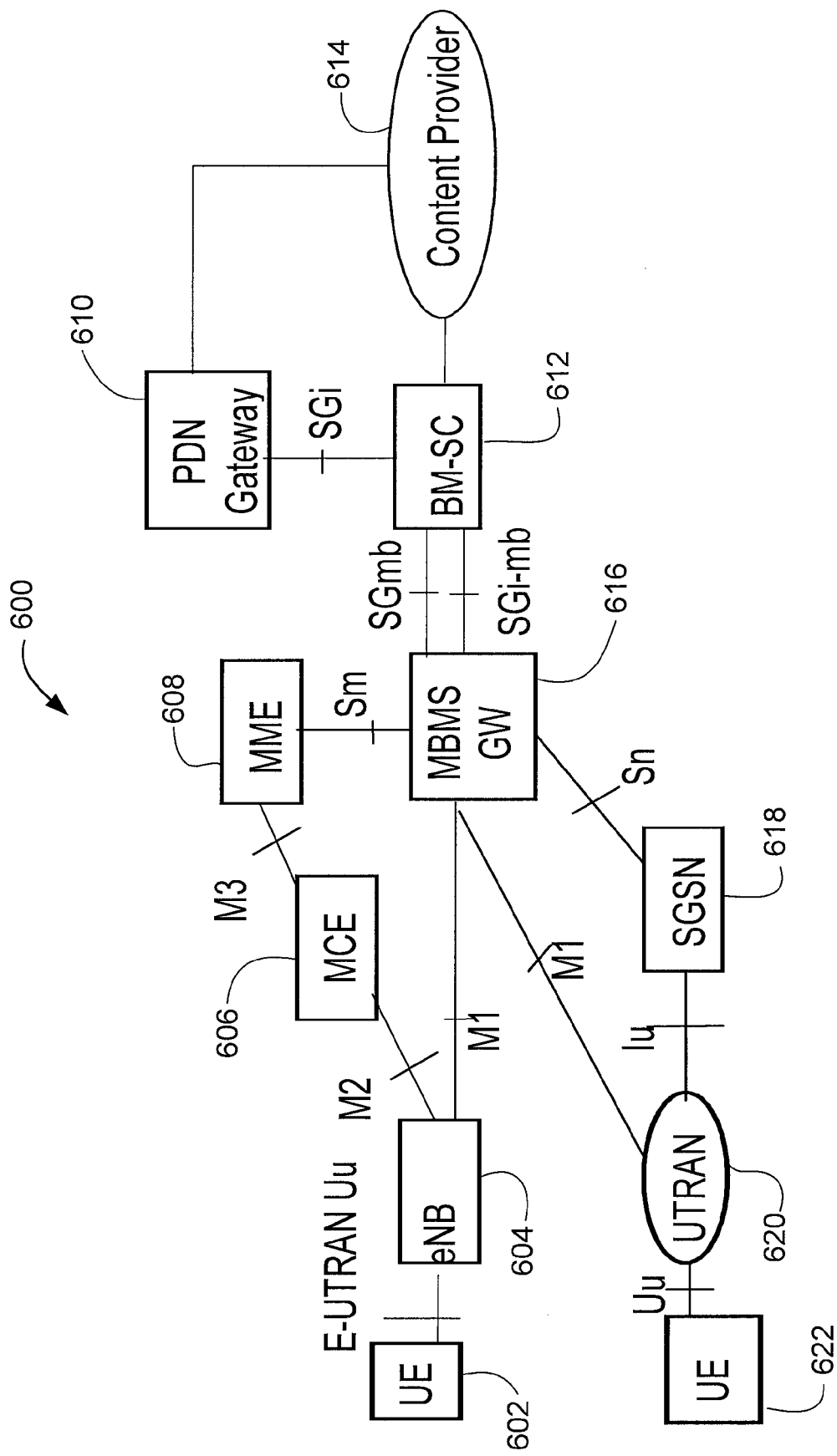
FIG. 6 is a block diagram illustrating components of a wireless communication system for providing or supporting MBSFN service.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNB may send a primary synchronization signal (PSS) (e.g., a primary synchronization code (PSC)) and a secondary synchronization signal (SSS) (e.g., a secondary synchronization code (SSC)) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
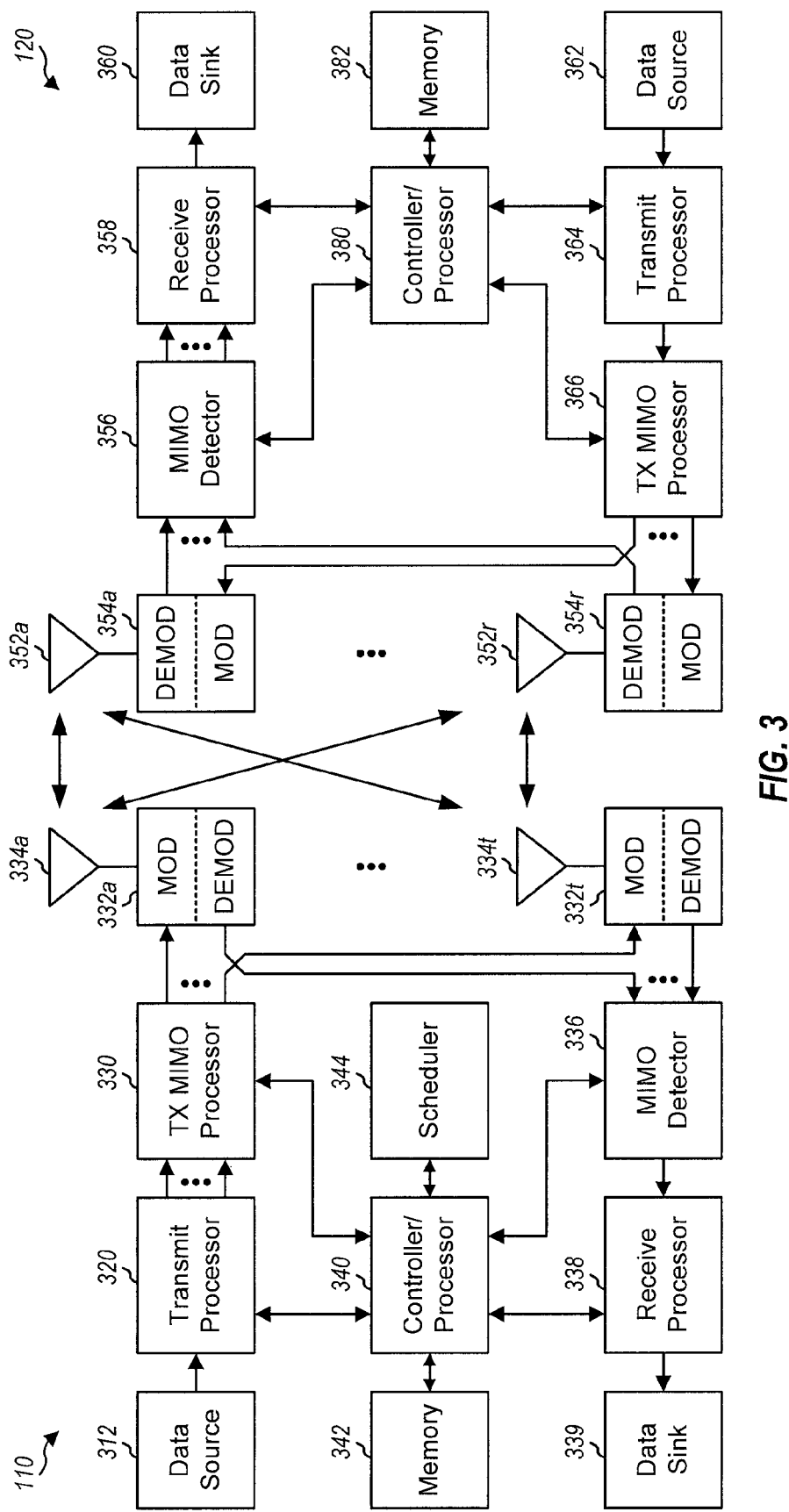
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for determining idle mode and receiving eMBMS of the UE, means for activating a power optimization procedure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

eMBMS AND UNICAST SIGNALING IN SINGLE FREQUENCY NETWORKS: One technique to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB(s) within radio range as part of the eMBMS service area or MBSFN area. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is a wireless network (e.g., a 3GPP network) having features relating to single carrier optimization for eMBMS.

eMBMS provides an efficient way to transmit shared content from an LTE network to multiple mobile entities, such as, for example, UEs.

With respect to a physical layer (PHY) of eMBMS for LTE Frequency Division Duplex (FDD), the channel structure may comprise time division multiplexing (TDM) resource partitioning between eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 4:
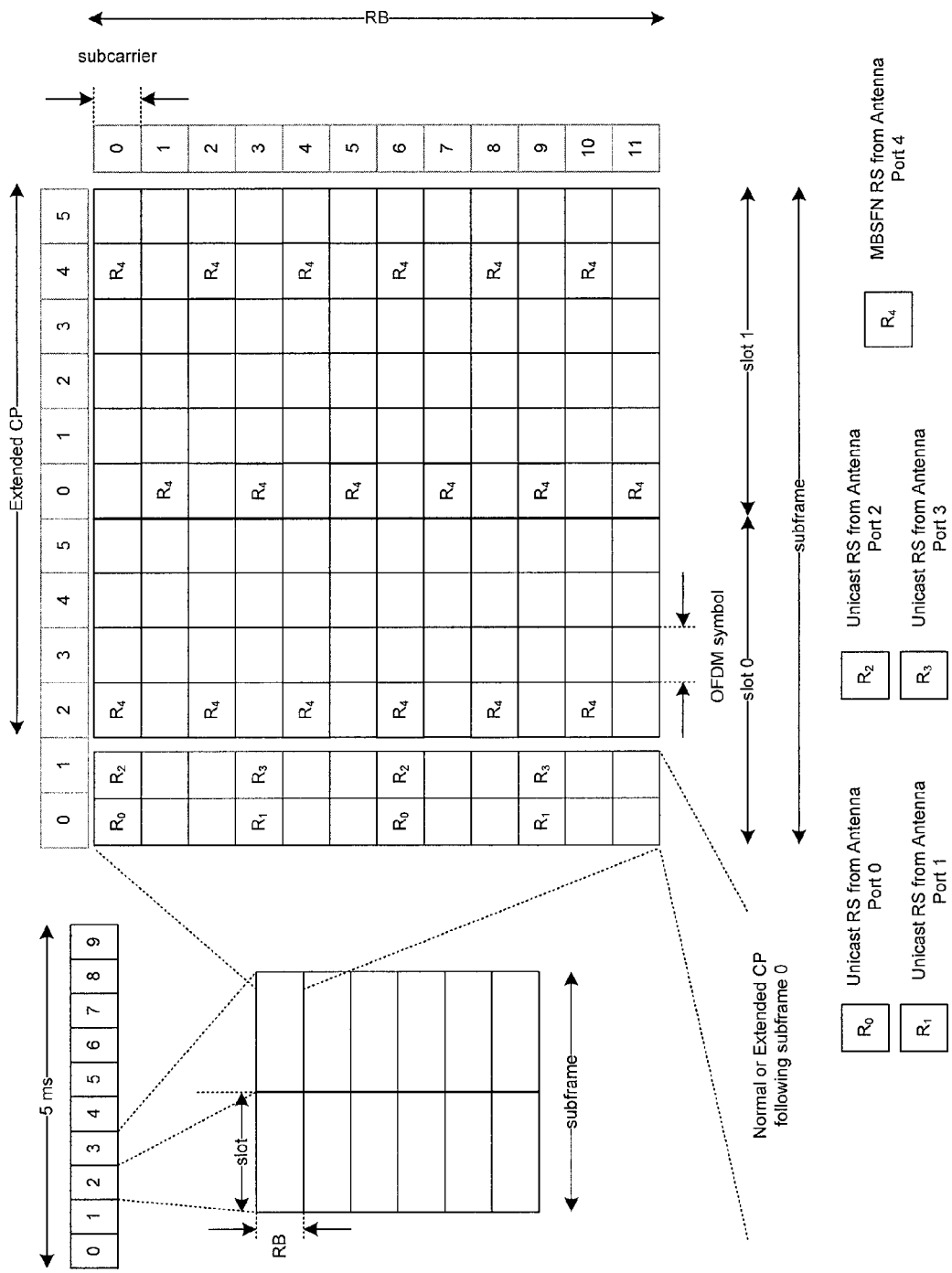
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes, for a single-carrier case. Components depicted in FIG. 4 correspond to those shown in FIG. 2, with FIG. 4 showing the individual subcarriers within each slot and resource block (RB). In 3GPP LTE, an RB spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

Figure 5:
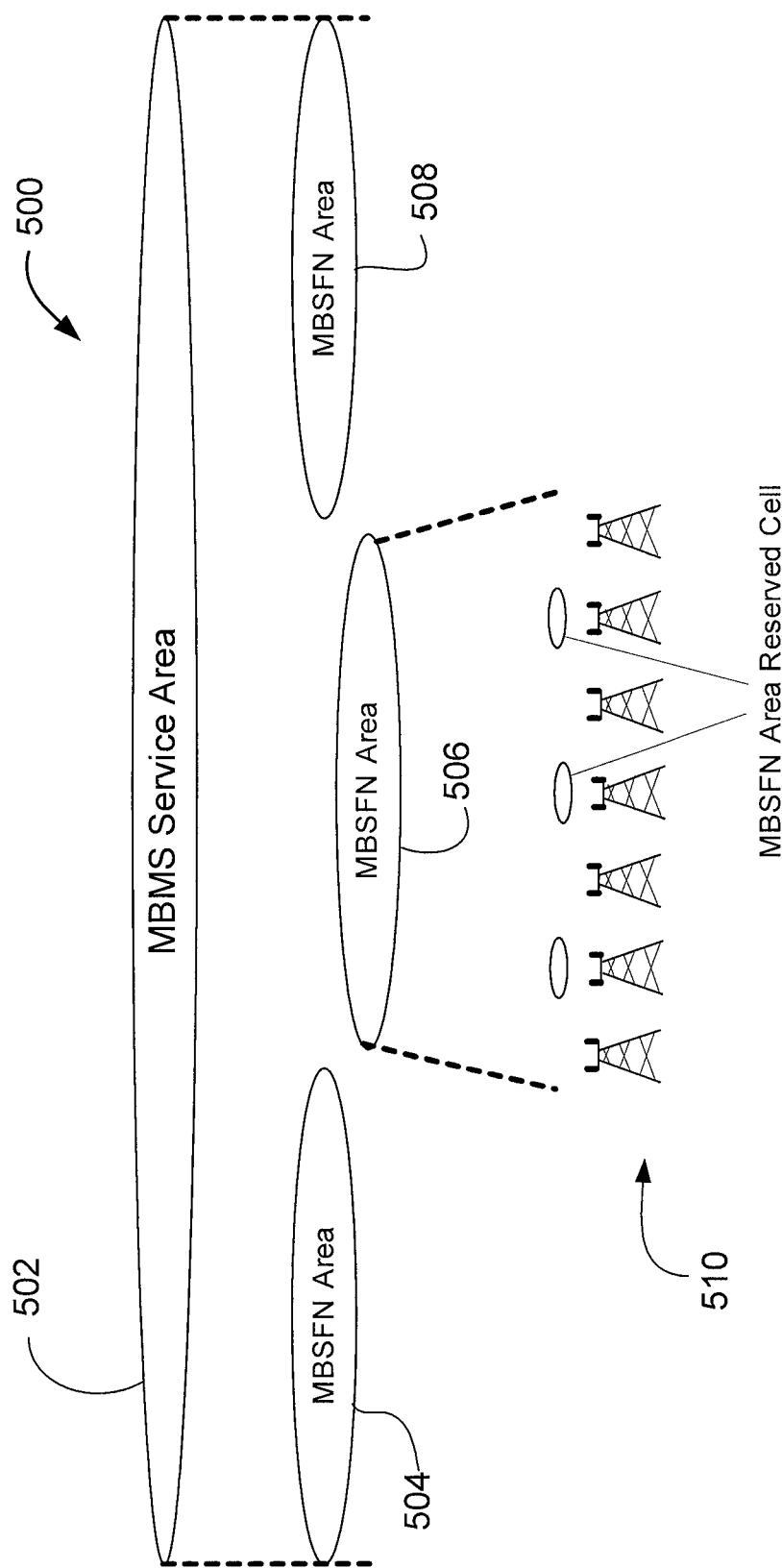
FIG. 5 is a diagram illustrating MBMS over a Single Frequency Network (MBSFN) areas within an MBSFN service area.

With continued reference to FIG. 4, within each eMBMS subframe, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe includes MBSFN RSs but not unicast RSs. The present technology is not limited to the particular frame allocation scheme illustrated by FIGS. 2 and 4, which are presented by way of example, and not by way of limitation. A multicast session or multicast broadcast as used herein may use any suitable frame allocation scheme.

eMBMS SERVICE AREAS: FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized fashion using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

eMBMS SYSTEM COMPONENTS AND FUNCTIONS: FIG. 6 illustrates functional entities of a wireless communication system 600 for providing or supporting MBSFN service. Regarding Quality of Service (QoS), the system 600 uses a Guaranteed Bit Rate (GBR) type MBMS bearer, wherein the Maximum Bit Rate (MBR) equals the GBR. These components are shown and described by way of example, and do not limit the inventive concepts described herein, which may be adopted to other architectures and functional distributions for delivering and controlling multicast transmissions.

The system 600 may include an MBMS Gateway (MBMS GW) 616. The MBMS GW 616 controls Internet Protocol (IP) multicast distribution of MBMS user plane data to eNodeBs 604 via an M1 interface; one eNB 604 of many possible eNBs is shown. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a user equipment (UE)/mobile entity 602 via an E-UTRAN Uu interface. The RNC 620 may provide MBMS content to a UE mobile entity 622 via a Uu interface. The MBMS GW 616 may further perform MBMS Session Control Signaling, for example MBMS session start and session stop, via the Mobility Management Entity (MME) 608 and Sm interface. The MBMS GW 616 may further provide an interface for entities using MBMS bearers through the SG-mb (user plane) reference point, and provide an interface for entities using MBMS bearers through the SGi-mb (control plane) reference point. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function form MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604.

The system 600 may further include a Broadcast-Multicast Service Center (BM-SC) 612 in communication with a content provider server 614. The BM-SC 612 may handle intake of multicast content from one or more sources such as the content provider 614, and provide other higher-level management functions as described below. These functions may include, for example, a membership function, including authorization and initiation of MBMS services for an identified UE. The BM-SC 612 may further perform MBMS session and transmission functions, scheduling of live broadcasts, and delivery, including MBMS and associated delivery functions. The BM-SC 612 may further provide service advertisement and description, such as advertising content available for multicast. A separate Packet Data Protocol (PDP) context may be used to carry control messages between UE and BM-SC 612. The BM-SC 612 may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, update and stop to the MBMS-GW 616 including session attributes such as QoS and MBMS service area.

The system 600 may further include a Multicast Management Entity (MME) 608 in communication with the MCE 606 and MBMS-GW 616. The MME 608 may provide a control plane function for MBMS over E-UTRAN. In addition, the MME may provide the eNB 604, UTRAN 620 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gateway (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

UEs generally discover the availability of eMBMS service access and corresponding access stratum configuration by camping on a particular cell and acquiring various signals and messages. This discovery process specifically includes acquiring broadcast system information, such as SIB 13 (SystemInformationBlockType13), acquiring MBSFNAreaConfiguration on MCCH, and acquiring MSI (MCH Scheduling Information), which allows the UE to acquire the MTCH transmission schedule within PMCH.

The SystemInformationBlockType13 (SIB13) is used, among other things, to indicate at least the following information: (a) MBSFN Area ID of each MBSFN supported by this cell; (b) information to acquire MCCH, which includes MCCH repetition period (32, 64, . . . , 256 frames), MCCH offset (0, 1, . . . , 10 frames), MCCH modification period (512, 1026 frames), Signaling MCS, and sf-AllocInfo, which identifies the subframes of the radio frame, as indicated by repetition period and offset, that can transmit MCCH; and (c) MCCH change notification configuration.

The message MBSFNAreaConfiguration on MCCH may indicate, among other things, the following information: (a) TMGI (Temporary Mobile Group Identity) and optional Session ID of each MTCH which is identified by the logical channel ID (LCID), within the PMCH; (b) allocated resource (such as radio frames and subframes) for transmitting each PMCH of the MBSFN area and the allocation period (4, 8, . . . , 256 frames) of the allocated resources for all the PMCHs in this area; and (c) MCH scheduling period (MSP) (8, 16, 32, . . . , or 1024 radio frames), over which the MCH Scheduling Information (MSI) MAC Control Element is transmitted. That is, the MSI MAC Control Element is sent once per MSP.

The MSI MAC Control Element is typically transmitted in the first subframe of each scheduling period of the PMCH. The MSI MAC Control Element may indicate the stop subframe and, therefore, subframe allocation of each MTCH within the PMCH can be known.

Figure 7:
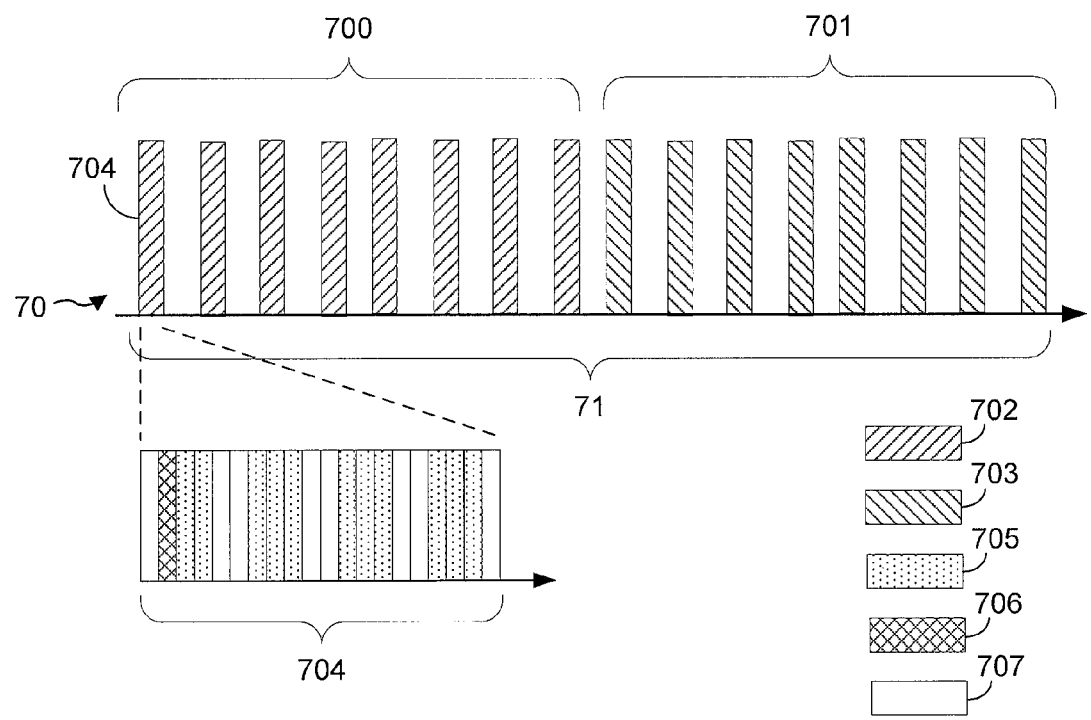
FIG. 7 is an illustration of data bursts in a common subframe allocation period received by a UE.

FIG. 7 shows a common subframe allocation period 71 of a radio frame 70 for a UE to receive data bursts from an eNB. An allocation period, such as common subframe allocation period 71, may be for example 1.28 seconds in various implementations. In this example, the UE receives at least one of the eMBMS channels (e.g., MTCH) in addition to MCCH and MSI. The example illustrated in FIG. 7 assumes the UE to receive one of two MTCHs. During a first half 700 of common subframe allocation period 71, multiple data bursts 702 are transmitted that include MTCH 1. Multiple data bursts 703 that include MTCH 2 are transmitted in a second half 701 of common subframe allocation period 71. One UE receives data bursts 702 of first half 700, while another UE likely receives data bursts 703 of second half 701. Each data burst, such as data burst 704, are divided into multiple subframes, including MBSFN subframes 705 with MTCH, MBSFN subframes 706 with MCCH and MSI, and unicast subframes 707.

The receiving UE will receive during only a part of common subframe allocation period 71. For example, the receiving UE typically only receives one MTCH. Therefore, a receiving UE will receive during first half 700, but not during second half 701. Within first half 700, the receiving UE may receive only during each of data bursts 702. Between each data burst, the receiving UE will have no data to receive. Within each data burst, such as data burst 704, the receiving UE will receive only during the MBSFN subframes 705 and 706. Thus, the receiving UE may be idle during unicast suubframes 707, the blank periods between each of data bursts 702, and during the entire period of second half 701. During an idle, the UE has an opportunity to enable power optimization procedures.

Figure 8:
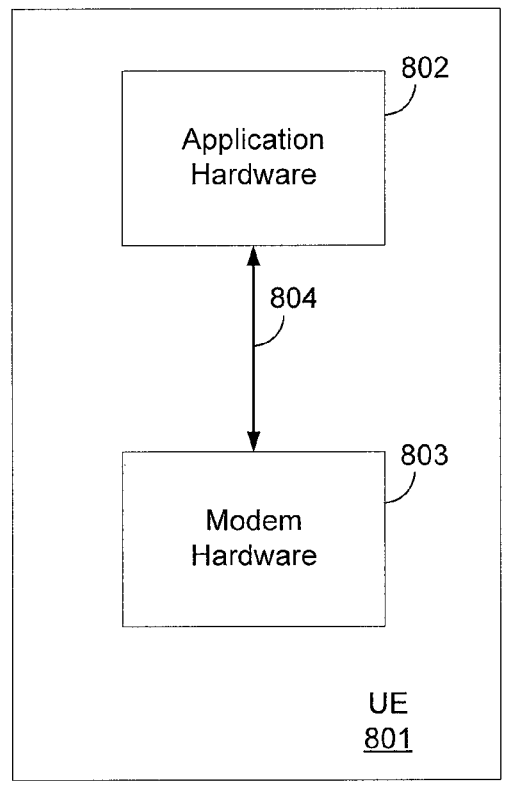
FIG. 8 is a block diagram illustrating hardware components of a UE.

FIG. 8 shows an example organization of hardware in UE 801, which includes application hardware 802, modem hardware 803, and communication bus 804 therebetween. Application hardware 802 includes an application chip set with one or more processors, associated memory and the like, and modem hardware 803 includes a modem chip set with one or more processors, antennas, modulators/demodulators, associated memory, and the like. In a downlink situation, modem hardware 803 receives data (e.g., eMBMS transmissions) from an eNB and forwards the data (e.g., IP packets) along communication bus 804 to application hardware 802 for processing. In an uplink situation, application hardware 802 sends data via communication bus 804 to modem hardware 803 for transmission to eNB.

There are periods of time in which various hardware in UE 801 are not receiving and/or processing data. For example, during some periods of time, modem hardware 803 will be receiving data, while at the same time, communication bus 804 is transferring data and application hardware 802 is processing data. Likewise, during some periods of time, modem hardware 803 will be receiving data and application hardware 802 will be idle and not processing data. In other periods of time, both modem hardware 803 and application hardware 802 will be idle. And in still other periods of time, application hardware 802 will be receiving and/or processing data while modem hardware 803 will be idle and not receiving data. The various hardware can be in any combination of receiving, processing, transferring and/or idle at any given time, depending on the functions of the UE at any given time.

A power optimization procedure may be implemented by a UE to manipulate hardware in order to reduce power consumption. Further, a UE can determine periods of time during which hardware is in between receiving data, transferring data, and/or processing data and activate the power optimization procedure in order to realize power reduction. In an example method involving a power optimization procedure, a processor determines that the UE is in idle mode while the UE is receiving eMBMS. Based on that determination, a power optimization procedure is activated in order to reduce power consumption of the UE.

An exemplary power optimization procedure implements a hardware sleep procedure. A hardware sleep procedure may shut down various hardware in order to reduce power consumption. The hardware sleep procedure may be implemented to provide a single level hardware sleep or a multiple level hardware sleep. For example, with reference to FIG. 8 each sleep level may be applied to each of application hardware 802, modem hardware 803, and communication bus 804 to completely deactivate or shut down according to the sleep level, or the particular sleep level may be applied independently to any of application hardware 802, modem hardware 803, and communication bus 804, such that, for example, modem hardware 803 may be in one of the sleep modes, while application hardware 802 and communication bus 804 may be operating.

Depending on the level of sleep or the time in which the UE may be allowed to sleep, the various levels may provide for a short period of hardware sleep, a little longer period of hardware sleep, and a longest period of hardware sleep. These different levels of sleep may be referred to as a deep sleep, a light sleep, and a micro sleep (which also may be referred to as a very light sleep).

The various sleep levels shut down hardware for different amounts of time and may also shut down different ones of the hardware components. For example, in deep sleep, all of the UE's hardware may be completely shut down. Alternatively, in deep sleep, more of the UE's hardware (as compared to the other sleep levels) may be mostly shut down (as compared to the other sleep levels). The shut down hardware includes but is not limited to: baseband, RF, processor, memory, clock in the modem chip set and application CPU, multimedia DSP, memory in the application chip set, the UL transmission hardware (including power amplified (PA), UL baseband, and the like).

During a light sleep, some hardware can be completely shut down (or slowed down), such as RF, baseband, etc., in the modem chip set, while other hardware is allowed to operate. During a micro sleep, a minimum amount of hardware can be shut down (or slowed down), such as RF buffer, etc. Irrespective of which level of sleep is activated, when any one of the sleep levels is activated, the UL transmission hardware can optionally be shut down completely when the UE is in idle mode and receiving eMBMS transmissions. This may include hardware, such as the power amplified (PA), UL baseband, etc.

Which level of sleep is activated is contingent on the period of time in which the hardware is expected to be idle. For example, deep sleep can be established such that deep sleep is activated when the next time to receive or process is to be later than a given multiple x (for example, 100 ms). Light sleep can be established such that light sleep is activated when the next time to receive or process is to be later than a different, but shorter given multiple y (for example, 10 ms), wherein x>y. Similarly, micro sleep can be established such that micro sleep is activated when the next time to receive or process is to be later than another given multiple z (for example, 1 ms) wherein x>y>z.

Figure 9:
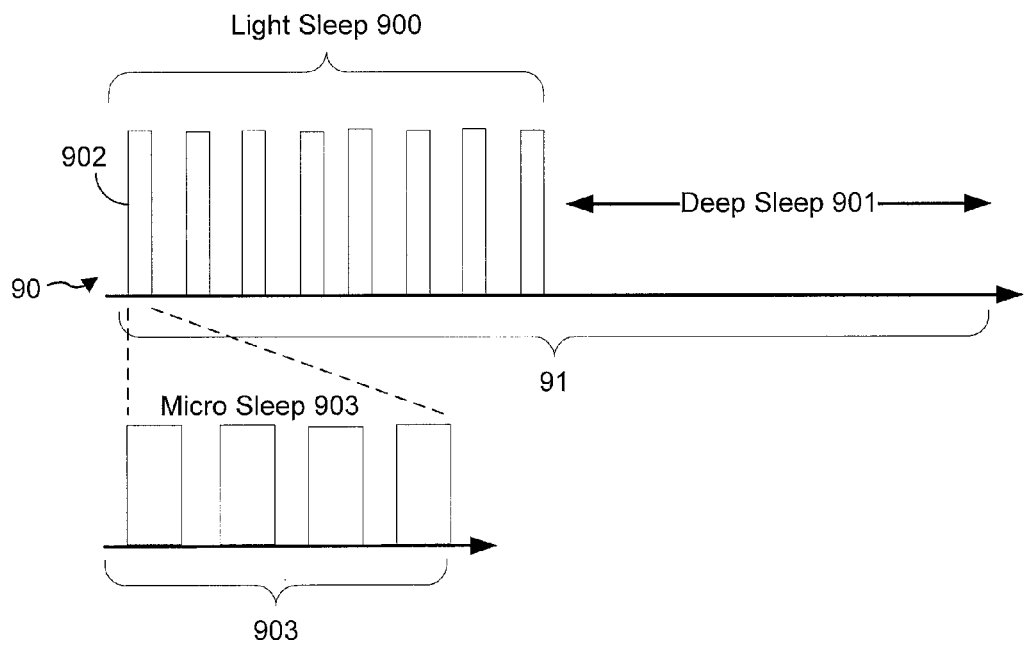
FIG. 9 is an illustration of a common subframe allocation period indicating periods for deep sleep, light sleep, and micro sleep, according to one aspect of the present disclosure.

FIG. 9 shows examples of timing for a deep sleep 901, a light sleep 900, and a micro sleep 903. FIG. 9 shows a common subframe allocation period 91 of a radio frame 90 for a UE to receive data bursts from an eNB (similar to that discussed above with regard to FIG. 7). The receiving UE typically receives only one MTCH. Therefore, a receiving UE will receive during first half 900, but not during second half 901. For example, one UE receives data bursts 902 during first half 900, while another UE likely receives data bursts (not shown) during the second half 901. Accordingly, the UE receiving during period 900 is not receiving data during second half 901. This occurrence gives the UE an opportunity to enable an optimization procedure.

During second half 901, the UE recognizes that modem hardware 803 is not expected to receive data bursts and the next time to receive or process a data burst is to be later than a given multiple x (for example, 100 ms), as explained above. Upon making this determination, the UE enables deep sleep wherein some or all of the UE's hardware (as described above) is shut down until the period of time that modem hardware 803 is expected to receive again.

On the contrary, during first half 900, the receiving UE expects to receive each of data bursts 902, which will be received within the given multiple x, described above. Due to this expectation, the UE determines that deep sleep should not be enabled during first half 900. However, the UE determines that there will be periods of time between receiving each of data busts 902. For example, the period of time between bursts may be longer than a given multiple y (for example, 10 ms) but shorter than given multiple x, wherein x>y. When the UE determines that there will be this given period of time between data bursts, the UE can enable a light sleep, wherein only some of UE hardware is shutdown, as described above to optimize power consumption.

Further, within each data burst 902 there are periods of time wherein the receiving UE will have no data to receive. Within each data burst 902, the receiving UE will only receive during the MBSFN subframes (see FIG. 7). Thus, the receiving UE may be idle during the blank periods between reception of MBSFN subframes. If the UE determines that next time to receive or process is to be later than another given multiple z (for example, 1 ms) but before multiple y, wherein x>y>z, the UE can enable micro sleep 903, as is described above.

Another exemplary power optimization procedure may adjust the clock rate of some or all of the UE hardware. For example, during certain periods of time, the data rate of eMBMS transmission is low. Therefore, the UE can use a lower clock rate in the hardware to save power. An example of a period of time having a low data rate transmission of eMBMS is when the UE is only receiving eMBMS service in the idle mode and does not have unicast high speed data transmission and reception. The data rate of eMBMS service received can be known in advance from User Service Description (USD) in the service announcement procedure. This is known from application hardware, which forwards to modem hardware to set a reduced clock rate accordingly. Once the UE determines that the transmission rate will be low, the UE can enable this power optimization procedure, which lowers the various hardwares clock rate.

Figure 10:
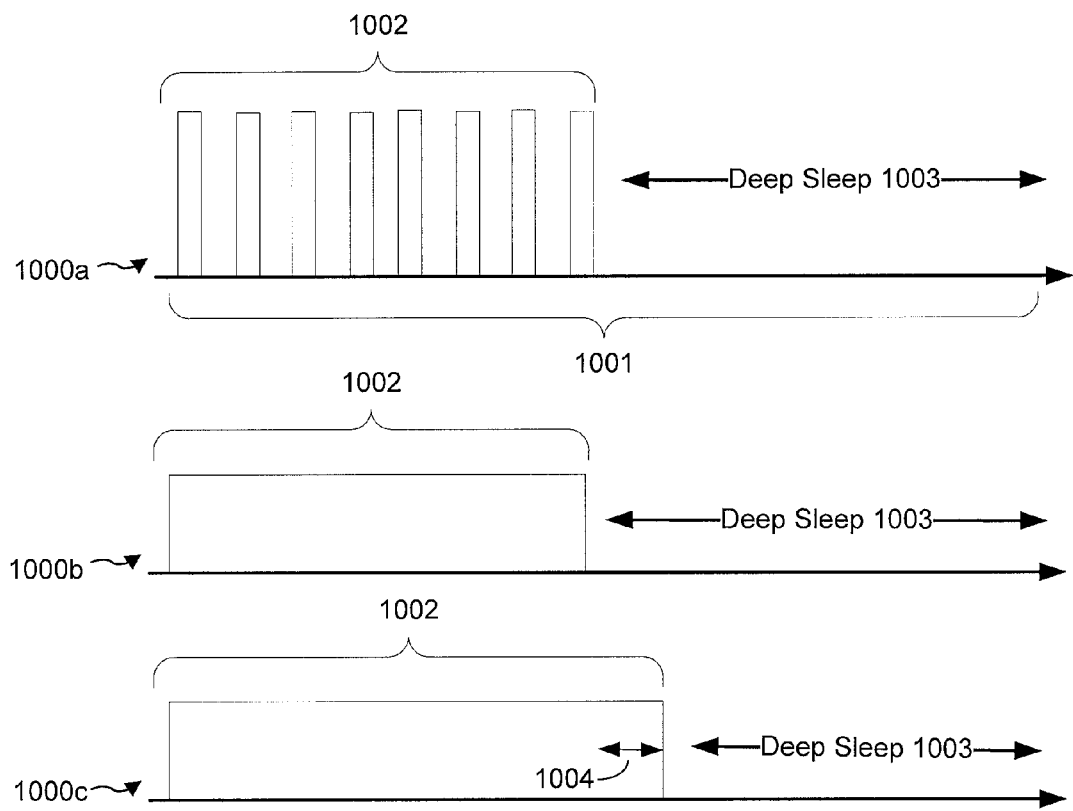
FIG. 10 illustrates common subframe allocation periods for a communication bus configured according to one aspect of the present disclosure.

Yet another exemplary power optimization procedure temporarily shuts down a communication bus between hardware of the UE. One such communication bus that can be shut down is a communication bus 804 between a modem chip set 803 and an application chip set 802. Communication between modem hardware 803 and application hardware 802 may not be needed during some portion of a common subframe allocation period or during a time period of not receiving data bursts. FIG. 10 illustrates this concept.

For example, during a first period 1002 of radio frame 1000a, modem chip set 803 receives data from eNB and forwards IP packets to the application chip 802 set to process. After that, the second period 1003 begins wherein data activity between modem chip set 803 and application hardware 802 ends temporarily 1003, and the communication bus 804 is not used. Because communication bus 804 is idle during period 1003, communication bus 804 is shut down temporarily in order to reduce power consumption. In this example, the UE enables deep sleep 1003, as is described above. When this power optimization procedure is activated, the communication bus 804 can be shut down until the beginning of the next common subframe allocation period. As illustrated in radio frame 1000a, one way to determine that the communication bus can be shut down occurs when hardware (for example the modem chip set 803) makes the determination based on the subframe allocation of a MTCH by reading MSI, MCCH. If the next time to receive MTCH (and/or other reception events of MSI, MCCH) is more than a threshold amount of time, the communication bus can be shut down 1003.

Radio frame 1000b shows radio frame 1000a without the subframes, to further simply the concept. During period 1002, modem chip set 803 is transmitting data to application chip set 802 over communication bus 804. Upon UE determining that modem chip set 803 no longer needs to transmit data to application chip set 802, the UE enables the power optimization procedure 1003.

Radio frame 1000c illustrates an alternative way to determine that this power optimization procedure could be enabled. In this alternative embodiment, the UE uses an inactivity timer to determine whether data has or has not been transferred on communication bus 804 for a threshold period of time. When the UE determines that the communication bus 804 has not transferred data for a threshold period of time 1004, then the communication bus 804 can be shut down until the communication bus needs to transmit data again. FIG. 10 shows the shut down period 1003 as being a deep sleep, but the shut down period 1003 could also be a light sleep or micro sleep, if desired, and which sleep is selected could be contingent on the period of time the communication bus is expected to be idle, as is described above.

Figure 11B:
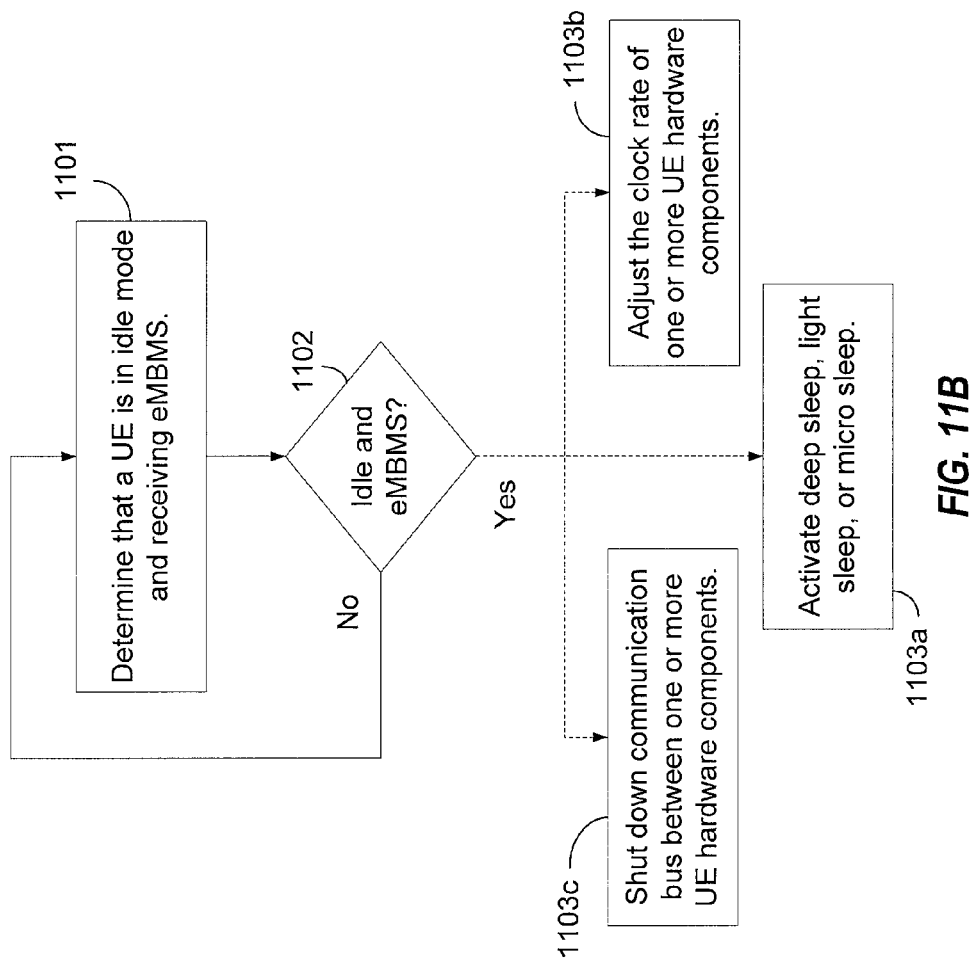
FIG. 11B is functional block diagram illustrating example blocks executed to implement one aspect of the present disclosure.
Figure 11A:
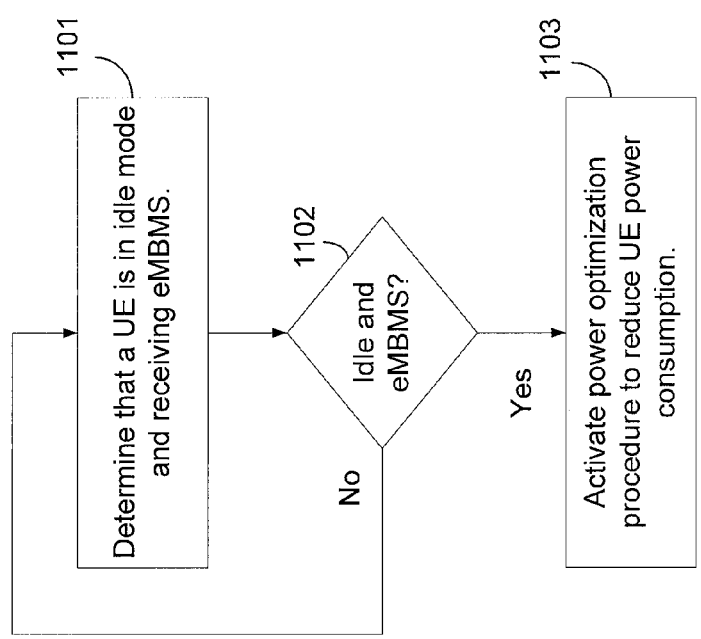
FIG. 11A is functional block diagram illustrating example blocks executed to implement one aspect of the present disclosure.

FIG. 11A shows an embodiment wherein a method is operable by a network entity for wireless communication, that includes determining, by a processor device, that User Equipment (UE) is in idle mode and receiving eMBMS (evolved Multimedia Broadcast and Multicast Service) (block 1101). Block 1102 illustrates that the UE may make this determination from time to time to ensure that the UE is still in idle mode and receiving eMBMS. Based on this determination, the UE will activate a power optimization procedure in order to reduce power consumption of the UE (block 1102).

As shown in FIG. 11B, the power optimization procedure can be a multiple level hardware shut down including one or more of: a deep sleep, a light sleep, and a micro sleep (block 1103a). Additionally (or alternatively), in embodiments, the power optimization procedure lowers a clock rate of at least some hardware of the UE (block 1103b). For example, the entire UE, application hardware 802, modem hardware 803, and/or communication bus 804 may have their clock rates lowered. In further embodiments, the power optimization procedure may additionally or alternatively lower power consumption of the UE by temporarily shutting down communication bus 804 between modem hardware 803 and application hardware 802 of the UE (block 1103c).

In operation, the UE determines that the UE is in idle mode and receiving eMBMS, block 1101. Block 1102 illustrates that the UE may make this determination from time to time to ensure that the UE is still in idle mode and receiving eMBMS. Based on this determination, the UE will activate one or more of power optimization procedures 1103a, 1103b, and/or 1103c in order to reduce power consumption of the UE.

Additional representative aspects of the present disclosure are directed to a communication apparatus that includes means for determining that User Equipment (UE) is in idle mode and receiving eMBMS (evolved Multimedia Broadcast and Multicast Service); and based on said determining, means for activating an optimization procedure in order to reduce power consumption of the UE.

Further representative aspects of the present disclosure are directed to a non-transitory computer-readable medium having program code stored thereon. The program code, when executed by a computer, causes the computer to determine that User Equipment (UE) is in idle mode and receiving eMBMS (evolved Multimedia Broadcast and Multicast Service); and based on said determination, activate a power optimization procedure in order to reduce power consumption of the UE.

Additional representative aspects of the present disclosure are directed to an apparatus configured for wireless communication that includes at least one processing device operable to determine that User Equipment (UE) is in idle mode and receiving eMBMS (evolved Multimedia Broadcast and Multicast Service), wherein based on said determination the processing device is further operable to activate a power optimization procedure in order to reduce power consumption of the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a network entity for wireless communication, comprising:
    determining, by a User Equipment (UE), that the UE is in idle mode and receiving evolved Multimedia Broadcast and Multicast Service (eMBMS);
    receiving, by the UE, a schedule for eMBMS transmission;
    determining, by the UE, a period of time in which the UE is expected to be idle based on the received eMBMS transmission schedule; and
    activating a power optimization procedure in order to reduce power consumption of the UE, wherein the power optimization procedure is activated based at least in part on the determined period of time, and wherein the activating the power optimization procedure includes:
        activating a deep sleep when the determined period of time exceeds a first idle time;
        activating a light sleep when the determined period of time exceeds a second idle time, wherein the second idle time is shorter in duration than the first idle time; and
        activating a micro sleep when the determined period of time exceeds a third idle time, wherein the third idle time is shorter in duration than the second idle time.

2. The method of claim 1 wherein the power optimization procedure is a multiple level hardware shut down in which the level of hardware shut down corresponds to whether the activated power optimization procedure is the deep sleep, the light sleep, or the micro sleep.

3. The method of claim 1 further comprising:
    identifying that said UE does not have unicast high speed data transmission and reception; and
    based on said identifying and said determining, activating the power optimization procedure in order to reduce power consumption of the UE.

4. The method of claim 1 wherein the power optimization procedure lowers a clock rate of at least one hardware component of the UE.

5. The method of claim 1 wherein the power optimization procedure temporarily shuts down a communication bus between hardware of the UE.

6. The method of claim 5 wherein the communication bus is between a modem chip set and an application chip set.

7. The method of claim 1 wherein said activating is activated by an application chip set.

8. A non-transitory computer-readable medium having instructions stored thereon, wherein the instructions, when executed by a computer, cause the computer to:

determine, by a User Equipment (UE), that the UE is in idle mode and receiving evolved Multimedia Broadcast and Multicast Service (eMBMS);
receive, by the UE, a schedule for eMBMS transmission;
determine, by the UE, a period of time in which the UE is expected to be idle based on the received eMBMS transmission schedule; and
based on said determination of the period of time, activate a power optimization procedure in order to reduce power consumption of the UE, and wherein the computer is caused to activate the power optimization procedure by:
causing the computer to activate a deep sleep when the determined period of time exceeds a first idle time;
causing the computer to activate a light sleep when the determined period of time exceeds a second idle time, wherein the second idle time is shorter in duration than the first idle time; and
causing the computer to activate a micro sleep when the determined period of time exceeds a third idle time, wherein the third idle time is shorter in duration than the second idle time.

9. The non-transitory computer-readable medium of claim 8 wherein the power optimization procedure is a multiple level hardware shut down in which the level of hardware shut down corresponds to whether the activated power optimization procedure is the deep sleep, the light sleep, or the micro sleep.

10. The non-transitory computer-readable medium of claim 8 further comprising instructions causing the computer to:
identify that said UE does not have unicast high speed data transmission and reception; and
based on said identifying and said determining the period of time, activate the power optimization procedure in order to reduce power consumption of the UE.

11. The non-transitory computer-readable medium of claim 8, wherein the power optimization procedure lowers a clock rate of at least some hardware of the UE.

12. The non-transitory computer-readable medium of claim 8 wherein the power optimization procedure temporarily shuts down a communication bus between hardware of the UE.

13. An apparatus configured for wireless communication, comprising:
at least one processor; and
a memory coupled to said at least one processor, wherein the at least one processor is configured to:
determine, by a User Equipment (UE), that the UE is in idle mode and receiving evolved Multimedia Broadcast and Multicast Service (eMBMS);
receive, by the UE, a schedule for eMBMS transmission;
determine, by the UE, a period of time in which the UE is expected to be idle based on the received eMBMS transmission schedule; and
activate a power optimization procedure in order to reduce power consumption of the UE based at least in part on said determination of the period of time, and wherein the configuration of the at least one processor to activate the power optimization procedure include:
to activate a deep sleep when the determined period of time exceeds a first idle time;
to activate a light sleep when the determined period of time exceeds a second idle time, wherein the second idle time is shorter in duration than the first idle time; and
to activate a micro sleep when the determined period of time exceeds a third idle time, wherein the third idle time is shorter in duration than the second idle time.

14. The apparatus of claim 13 wherein the power optimization procedure is a multiple level hardware shut down in which the level of hardware shut down corresponds to whether the activated power optimization procedure is the deep sleep, the light sleep, or the micro sleep.

15. The apparatus of claim 13 wherein said at least one processor is further configured to
identify that said UE does not have unicast high speed data transmission and reception; and
activate the power optimization procedure in order to reduce power consumption of the UE based on said identification and said determination of the period of time.

16. The apparatus of claim 13 wherein the power optimization procedure lowers a clock rate of at least some hardware of the UE.

17. The apparatus of claim 13 wherein the power optimization procedure temporarily shuts down a communication bus between hardware of the UE.

* * * * *